US 6,604,348 B2

(12) United States Patent
Hunt

(10) Patent No.: US 6,604,348 B2
(45) Date of Patent: Aug. 12, 2003

(54) MOWER WITH ENGINE-DRIVEN BLADE AND ELECTRICAL PROPULSION

(75) Inventor: Kenneth Edward Hunt, Oconomowoc, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/777,815

(22) Filed: Feb. 6, 2001

(65) Prior Publication Data
US 2002/0104300 A1 Aug. 8, 2002

(51) Int. Cl.$^7$ .................. A01D 34/03; A01D 34/43; A01D 34/64
(52) U.S. Cl. .............. 56/10.6; 56/10.2 R; 56/13.5; 56/DIG. 7
(58) Field of Search ................. 56/10.8, 13.5, 56/10.2 A, 10.7, 11.9, 12.7, 16.9, 17.5, 10.6, 2, DIG. 7; 180/167

(56) References Cited

U.S. PATENT DOCUMENTS

| 3,095,939 | A | * | 7/1963 | Hine | 180/167 |
|---|---|---|---|---|---|
| 3,800,902 | A | * | 4/1974 | Keller | 180/167 |
| 3,924,389 | A | * | 12/1975 | Kita | 56/10.2 |
| 4,145,864 | A | * | 3/1979 | Brewster, Jr. | 56/10.2 |
| 4,306,329 | A | * | 12/1981 | Yokoi | 15/319 |
| 4,318,266 | A | * | 3/1982 | Taube | 56/10.2 R |
| 4,450,673 | A | * | 5/1984 | Hutchison | 56/17.5 |
| 4,559,768 | A | | 12/1985 | Dunn | 56/16.9 |
| 4,694,639 | A | | 9/1987 | Chen et al. | 56/10.2 |
| 4,777,785 | A | * | 10/1988 | Rafaels | 56/10.2 A |
| 4,879,867 | A | * | 11/1989 | Wenzel | 56/11.1 |
| 4,887,415 | A | * | 12/1989 | Martin | 56/10.2 |
| 4,896,488 | A | * | 1/1990 | Duncan et al. | 56/13.7 |
| 4,964,265 | A | * | 10/1990 | Young | 56/10.8 |
| 5,081,365 | A | | 1/1992 | Field et al. | 290/45 |
| 5,204,814 | A | | 4/1993 | Noonan et al. | 364/424.02 |
| 5,323,593 | A | | 6/1994 | Cline et al. | 56/10.2 |
| 5,385,211 | A | | 1/1995 | Carroll | 180/65.2 |
| 5,461,292 | A | | 10/1995 | Zondlo | 318/587 |
| 5,507,137 | A | * | 4/1996 | Norris | 56/10.2 J |
| 5,528,888 | A | | 6/1996 | Miyamoto et al. | 56/10.2 F |
| 5,572,856 | A | * | 11/1996 | Ku | 56/10.2 A |
| 5,794,422 | A | | 8/1998 | Reimers et al. | 56/11.9 |
| 5,832,703 | A | * | 11/1998 | Evans | 56/11.4 |
| 5,911,670 | A | | 6/1999 | Angott et al. | 56/10.2 A |
| 5,974,347 | A | | 10/1999 | Nelson | 701/22 |
| 6,044,922 | A | | 4/2000 | Field | 180/65.2 |
| 6,082,084 | A | | 7/2000 | Reimers et al. | 56/11.9 |
| 6,089,341 | A | | 7/2000 | Gingerich | 180/65.1 |
| 6,109,009 | A | | 8/2000 | Benson | 56/10.2 G |
| 6,301,863 | B1 | * | 10/2001 | Liebrecht | 56/10.6 |
| 6,339,735 | B1 | * | 1/2002 | Pelles et al. | 701/23 |

FOREIGN PATENT DOCUMENTS

| DE | 1 507 185 | 1/1970 |
|---|---|---|
| DE | 295 09 472 U1 | 10/1995 |
| DE | 100 27 531 A1 | 1/2001 |
| WO | WO 97/28681 | 8/1997 |

OTHER PUBLICATIONS

Hammacher Schlemmer Brochure, 2 pages, dated Spring 2000.
RoboMow, RoboMow Installation & Operation Guide, 8 pages, publication date—1999, publication location—unknown.
RoboMow, RoboMow Product Information, 2 pages, Internet printing dated Dec. 8, 2000.

* cited by examiner

Primary Examiner—Aradad Fabian Kovacs

(57) ABSTRACT

A self-propelled robotic or autonomous mower includes an internal combustion engine directly driving mowing structure such as a single blade or reel, or multiple blades or reels. Drive wheels are driven by one or more electric motors powered from a source including batteries and an engine-driven alternator. A controller connected between the wheel motors and the source and to a navigation system controls the wheel drive and steers the mower over a selected path. The mowing structure may be driven from the engine through a direct clutched or unclutched connection to the engine drive shaft, a belt drive, a hydraulic drive, or another similar direct drive arrangement which eliminates the limitations of an electric blade or reel drive.

27 Claims, 5 Drawing Sheets

MOWER WITH ENGINE-DRIVEN BLADE AND ELECTRICAL PROPULSION

FIELD OF THE INVENTION

The present invention relates generally to self-propelled mowers and, more specifically, to mowers with electric drives, particularly robotic or autonomous mowers.

BACKGROUND OF THE INVENTION

Robotic or autonomous residential lawn mowers are often battery powered and include an electric drive for the blade as well as for the wheels. An example of such a mower is the commercially available Friendly Robotics model RL500. The run times of such mowers are severely limited by the relatively high energy requirements which quickly drain the on-board batteries. The cutting device on the mower is a principle source of energy drain. Rotating blades with wing surfaces to create air flow for moving grass clippings and the impacting of the blades against the grass during cutting and/or mulching consume large amounts of power. For example, a single mower blade can require from a half to five horsepower, and a typical battery pack often has a maximum output of one horsepower or less. Therefore, severe limitations must be placed on blade design and blade function to lessen power requirements, and such limitations often reduce mower capacity and the ability of the mower to mow, mulch and move clippings. Even with the imposed limitations, premature failure of the electric motor driving the blade is common as a result of the heavy loading and severe operating conditions encountered by the mower. Available mower run times are relatively short, and recharging the batteries on such a mower can take up to twelve hours or more and require access to an electrical outlet.

Hybrid mowers, an example of which is shown in U.S. Pat. No. 6,044,922 issued to Bruce F. Field, include both an engine and a source of electrical power but typically provide electric drive to the cutting element. The drive wheels are either driven directly from the engine as disclosed in the above Field patent or by one or more electric motors, such as shown in U.S. Pat. No. 6,082,084 issued to Kirk W. Reimers et al. Therefore, although more power can be directed to the electric blade driving motor and run times can be extended by driving an alternator with the engine to maintain battery charge, the blade horsepower requirements and electric blade motor life expectancy still dictate blade design and function limitations that result in less than optimum mowing performance. Further, in robotic or autonomous mowers any use of direct engine-to-wheel drive such as shown in the Reimers patent, or in U.S. Pat. No. 5,528,888 issued to Yasuhiko Miyamoto et al, can require costly and complicated drive and steering controls.

BRIEF DESCRIPTION OF THE INVENTION

It is therefore an object of the present invention to provide an improved drive system for a self-propelled mower. It is another object to provide such a system which overcomes most or all of the aforementioned problems. It is still a further object to provide such a drive system which is particularly useful with a robotic or autonomous mower.

It is another object of the present invention to provide an improved drive system for a self-propelled mower having an electrically powered motor wherein blade performance is substantially improved compared to at least most previously available mower systems with electric drives. It is another object to provide such a system which improves mower capacity and run times and shortens turn-around times for improved mower productivity.

It is a further object of the present invention to provide an improved self-propelled mower having an electric wheel drive system in combination with an engine-driven blade drive which overcomes the blade design limitations typical of at least most previously available mower systems with electric drives. It is another object to provide such a system which obviates problems of electric drive cutter blades while retaining the control advantages present in an electric wheel drive system. It is yet a further object to provide such a system which is particularly useful with robotic or autonomous mowers.

In accordance with the above and additional objects of the invention, a self-propelled mower is provided with an internal combustion engine directly driving blade structure, including a single or multiple cutter blades such as winged mower blades, a reel or multiple reels. Drive is through a direct connection to the main drive shaft of the engine, a belt-type drive powered by the engine, or a hydrostatic drive having a pump connected to the engine and hydrostatic motor structure connected to the mower blades or reels. A source of electrical power on the mower includes a battery pack connected to a generating device such as an alternator connected to the engine. Drive structure supports the mower for movement over the ground and preferably includes drive wheels connected to electric motor structure powered exclusively by the source of electrical power. A controller connected to a navigation system and to the electric motor structure selectively powers the drive structure from the source to control mower speed and direction.

The drive system is particularly useful with autonomous and robotic mowers. Mower propulsion and steering is directed by the navigation system and controller. Cutting devices with higher power requirements and better cutting and conveying capacity, such as the winged blades or multiple reels, can be used since limitations of electric motor drives are avoided. Mower wheel drive is never directly coupled to the engine but is connected to the electrical power source so that speed, direction and steering control is less costly and complex than in other types of propulsion systems, including hybrid systems, connecting the engine more directly to the wheels. Run time and mower capacity is significantly increased compared to at least most mowers having battery packs without on-board generating capability. The mower engine can be run at an optimum speed for maximizing engine efficiency and mower capacity while the electrical system provides precise control of torque, speed and direction. Complicated and costly transmission structure is avoided.

These and other objects, features and advantages of the present invention will become apparent to one skilled in the art upon reading the following detailed description in view of the drawings.

DETAILED DESCRIPTION OF THE DRAWINGS

Figure 1:
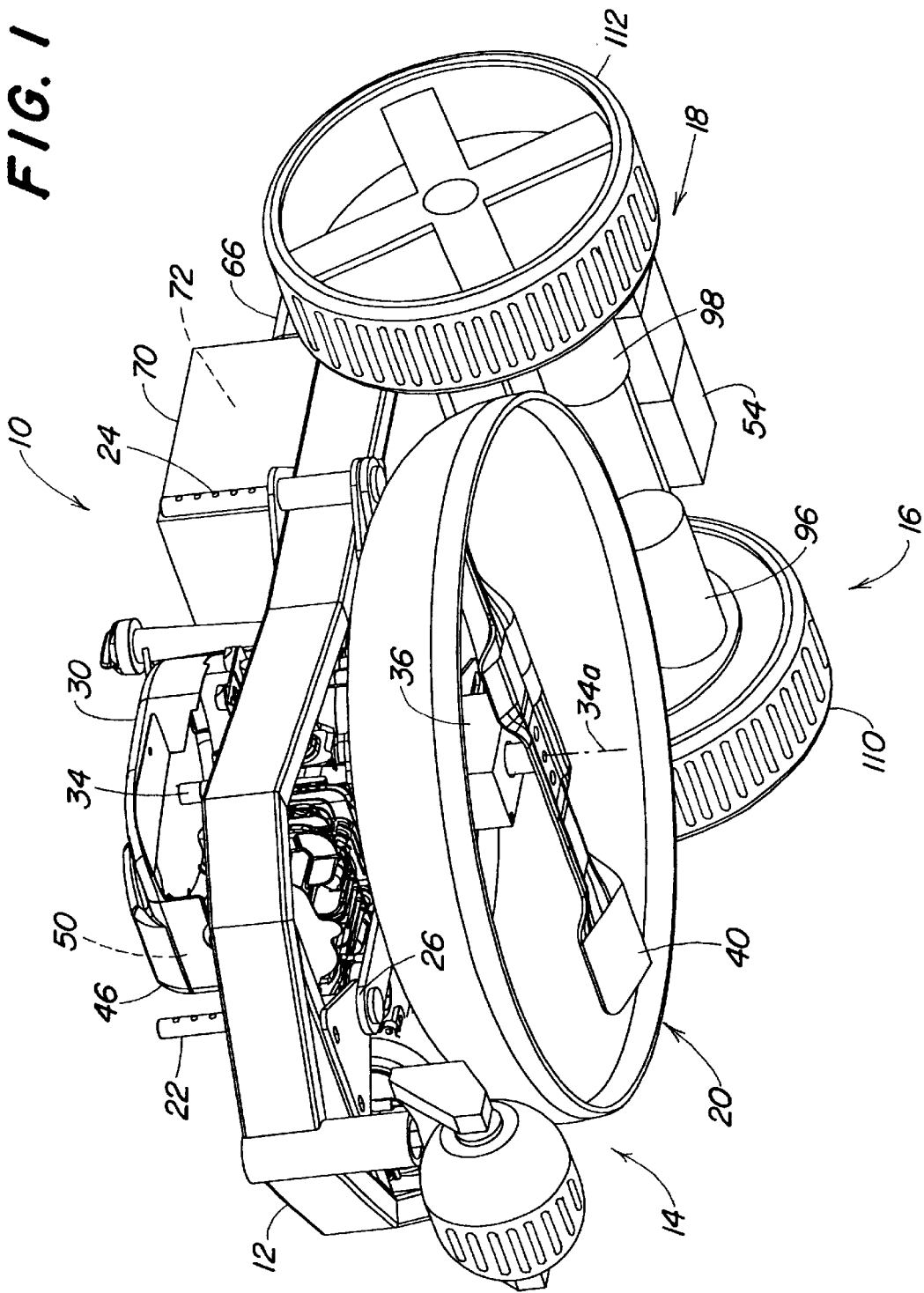
FIG. 1 is a perspective view of an autonomous single-blade mower with portions broken away to better show the drive system.

Referring now to FIG. 1, therein is shown a self-propelled mower 10 including a mower frame 12 supported above the ground by a forward caster wheel assembly 14 and rear electrically driven wheel assemblies 16 and 18. A conventional mower deck assembly indicated generally at 20 is adjustably supported from the frame 12 by transversely spaced mounts, one of which is shown at 24, and by a forward linkage, a portion of which is shown at 26, for movement of the deck up and down between a working position and a transport position and for changing the cutting height of the deck assembly when in the working position.

An internal combustion engine 30 is supported on the mower deck assembly 20 and includes a vertical drive shaft 34 connected through a blade brake clutch (BBC) assembly 36 to a winged mower blade 40 for rotation of the blade about the drive shaft axis (34a). Alternatively, the blade 40 may be mounted directly on the lower end of the engine drive shaft 34, and an engine kill circuit is used to kill the engine and stop the blade rotation.

Supported within an upper engine housing 46 is an electrical generator 50, preferably an alternator, driven by the engine and connected to a battery pack 54 (FIG. 2) through a voltage regulator 56. The alternator 50 and battery pack 54 define an electrical power source 58 which is also connected to an electrical propulsion and navigation system, indicated generally at 60 in FIG. 2. An electric starter 64 is connected to the engine 30 for cranking the engine at start-up. The battery pack 54 provides a nominal voltage, which preferably is in the range of approximately twelve to forty-two volts, and is supported from the frame 12 behind the rear drive wheel assemblies 16 and 18. A fuel tank 66 is located behind the engine 30.

The propulsion and navigation system 60 includes a main controller 70 (FIG. 2) connected to the power source 58 and to navigation and obstacle detection circuitry 72 for providing autonomous mower drive control. The controller 70 also includes an output 74 connected to the blade brake clutch assembly 36 for controlling the braking, engagement and disengagement of the blade 40. Wheel drive control outputs 76 and 78 of the controller 70 provide control to the individual drive wheel assemblies 16 and 18, respectively. The navigation and obstacle detection circuitry 72 preferably includes conventional contact sensors, ultrasonic sensors and/or infrared sensors for obstacle avoidance, and a conventional navigation system such as a global positioning satellite system, an ultrasonic system or a laser vision system. It is to be understood that the present invention may be utilized with many different navigation and obstacle detection circuitry types including operator remote control, and these specific types are given by way of example only.

The drive wheel assemblies 16 and 18 include electric drive control circuits 86 and 88 (FIG. 2) connected to the source 58 and have output terminals connected to electric drive motors 96 and 98. The outputs of the individual circuits 86 and 88, and thus the direction, speed and torque of the individual motors 96 and 98, are dependent on the control outputs 76 and 78. The polarity, voltage, duty cycle and/or amperage of the outputs of the drive circuits 86 and 88 can be varied to provide the desired control. Gear reduction drives 106 and 108 connect the outputs of the electric motors 96 and 98 to drive wheels 110 and 112 to propel the mower in the forward and rearward directions and steer the mower 10 under direction of the controller 70 and the navigation and obstacle detection circuitry 72. The controller 70 and the circuitry 72 also control engagement and disengagement of the drive to the blade 40.

Figure 5:
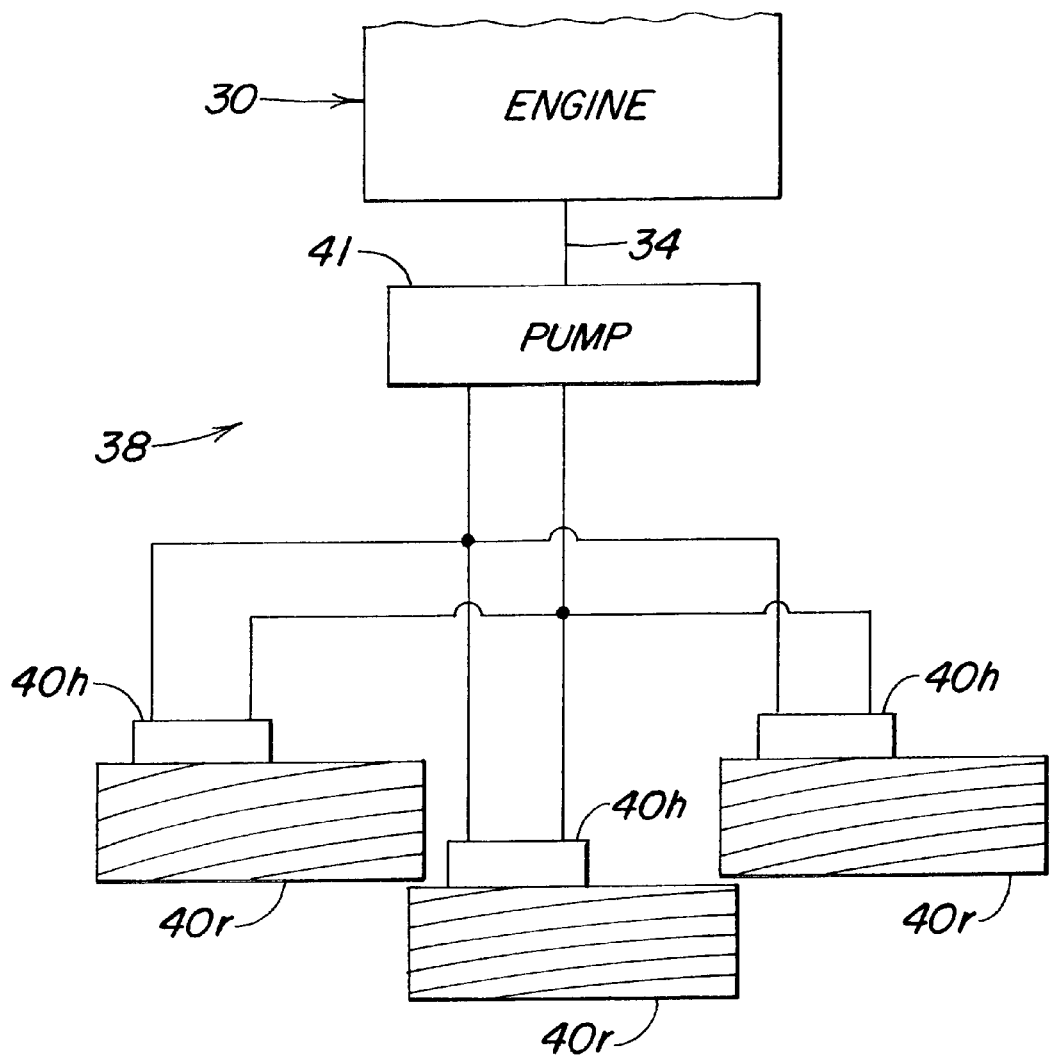
FIG. 5 is a schematic representation of a portion of a mower with a hydraulic cutter drive.

One can appreciate from the above-described system that mower blade drive is provided directly from the engine 30. If desired, drive to the blade or blades can be provided through an engine-driven hydraulic drive, such as a hydrostatic drive 38 as shown schematically in FIG. 5. For example, if multiple reels 40r provide the cutting function, drive can be provided by hydraulic motors 40h connected to the reels and driven by a hydraulic pump 41 connected to the drive shaft 34 of the engine 30. Therefore, blades with higher power requirements and better cutting and conveying capacity, such as the winged blade 40 shown in the drawing figures or multiple reels 40r shown in FIG. 5, can be used since limitations of electric motor drives are avoided. Further, mower propulsion and steering is under the control of the controller 70 and the circuitry 72. Mower wheel drive is not directly coupled to the engine 30 but is connected to the electrical power source for more convenient and less costly and complex speed, direction and steering control than is required with other types of propulsion systems, including some hybrid systems, connecting the engine to the wheels.

Figure 3:
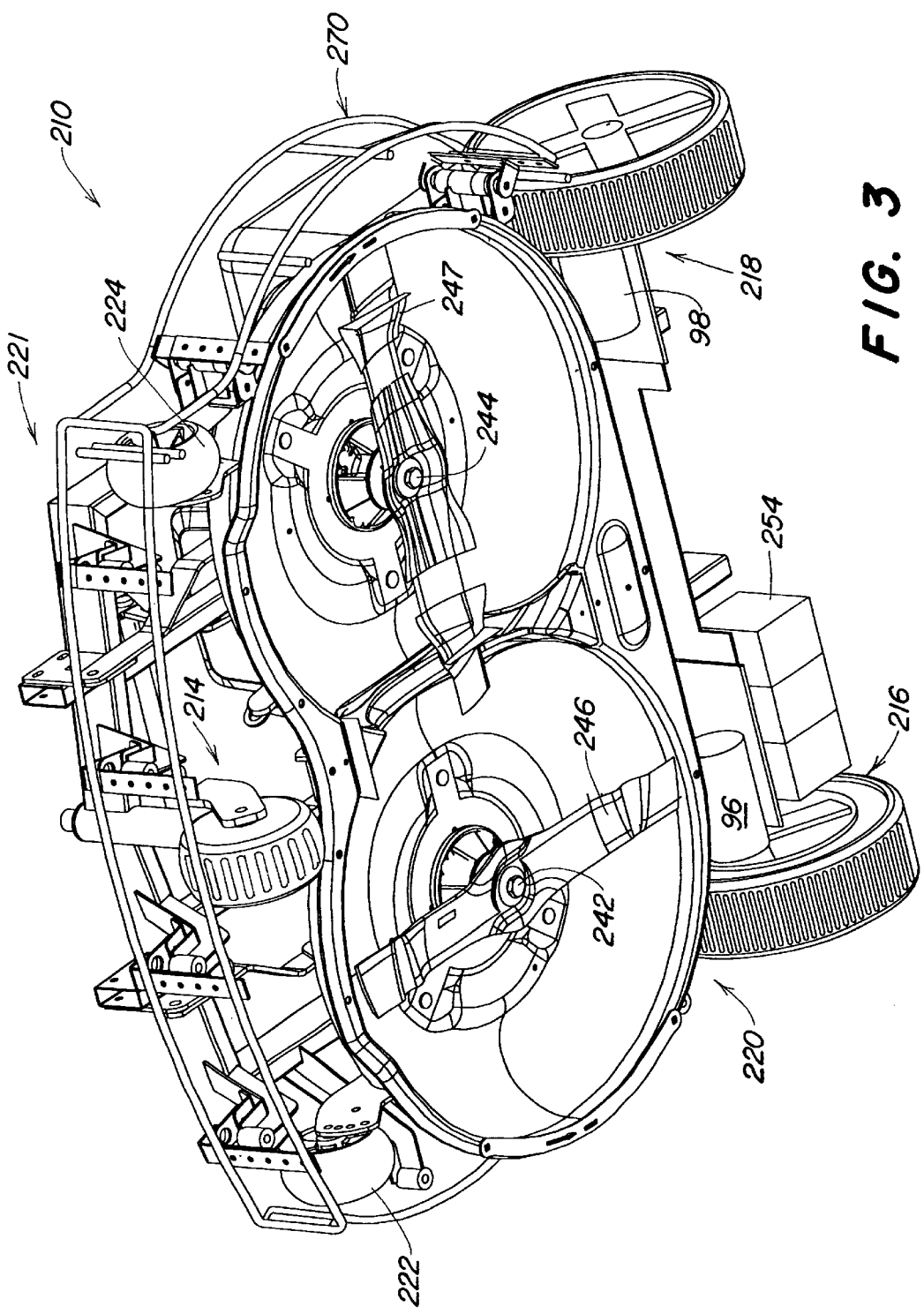
FIG. 3 is a perspective view of a portion of an autonomous multi-blade mower with an electric drive wheel system and engine-driven blades.
Figure 4:
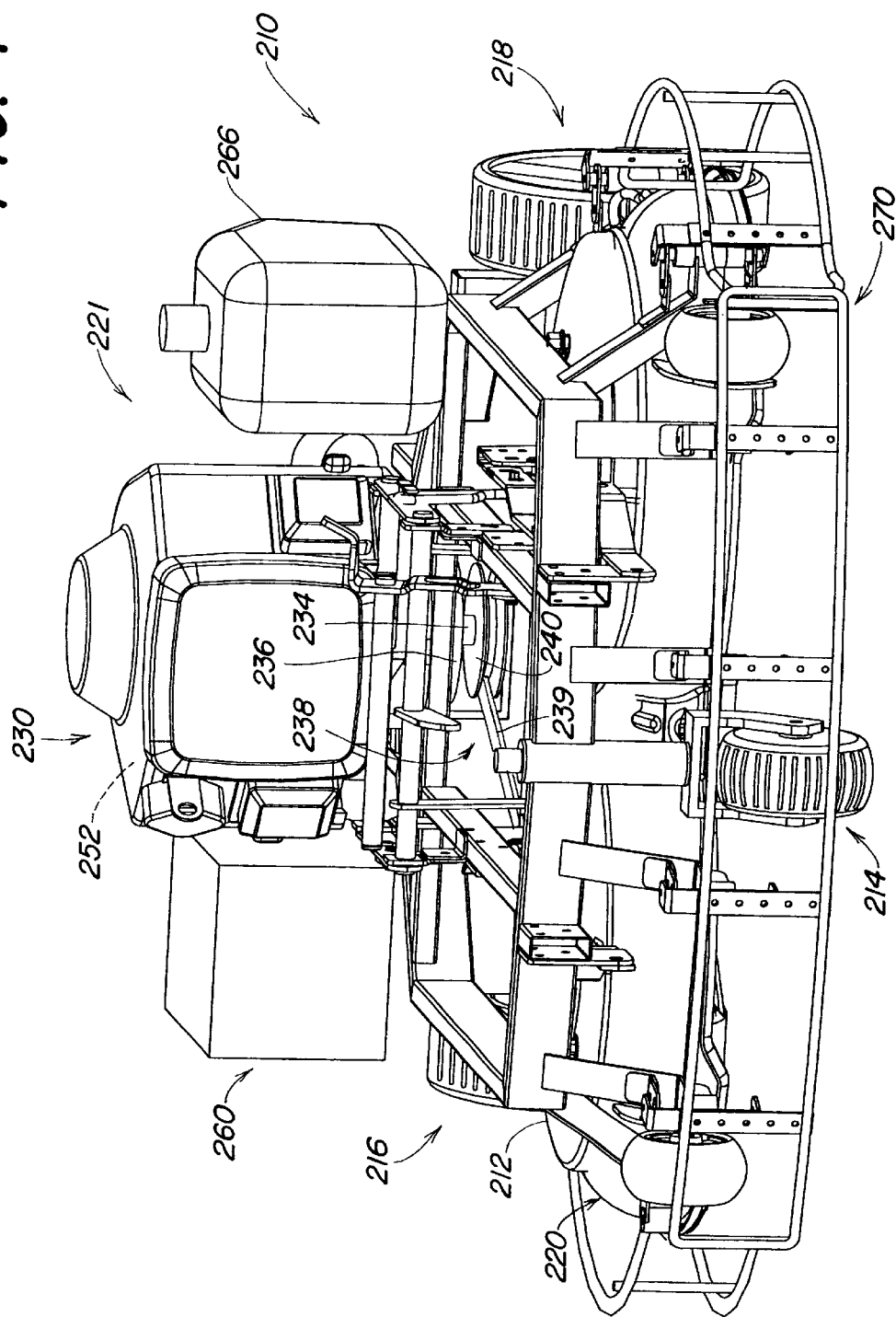
FIG. 4 is a front perspective view of the mower of FIG. 3 with portions broken away to better show drive components.

Referring now to FIGS. 3 and 4, therein is shown an alternate embodiment of the invention including a multi-blade cutting device driven directly by an engine. A self-propelled mower 210 includes a mower frame 212 (shown partially broken away) supported above the ground by a forward caster wheel assembly 214 and rear electrically driven wheel assemblies 216 and 218. A dual-blade mower deck assembly indicated generally at 220 is adjustably supported from the frame 212 by a conventional deck lift assembly (not shown) for movement between a raised transport position and lowered mowing positions. Adjustable gauge wheels 222 and 224 support the forward portions of the deck 220. When the deck is lowered to the mowing position, cutting height can be adjusted using the deck lift assembly and adjustable gauge wheels 222 and 224.

An internal combustion engine 230 is supported on the mower deck assembly 220 and includes a vertical drive shaft 234 connected through an electric PTO clutch 236 to a belt drive 238. A belt 239 (FIG. 4) is trained around a drive sheave 240 connected for rotation about axis 234a of the shaft 234. The belt 239 is also trained around a pulley (not shown) located on the housing and driving counter-rotating upright shafts 242 and 244 through a conventional synchronous drive extending between the shafts. The axes of the shafts 234, 242 and 244 are generally parallel, and winged mower blades 246 and 247 are supported at the lower ends of the shafts 242 and 244 for rotation about the corresponding shaft axes. Alternatively, a non-synchronous V-belt drive may be provided between the shafts 242 and 244.

Figure 2:
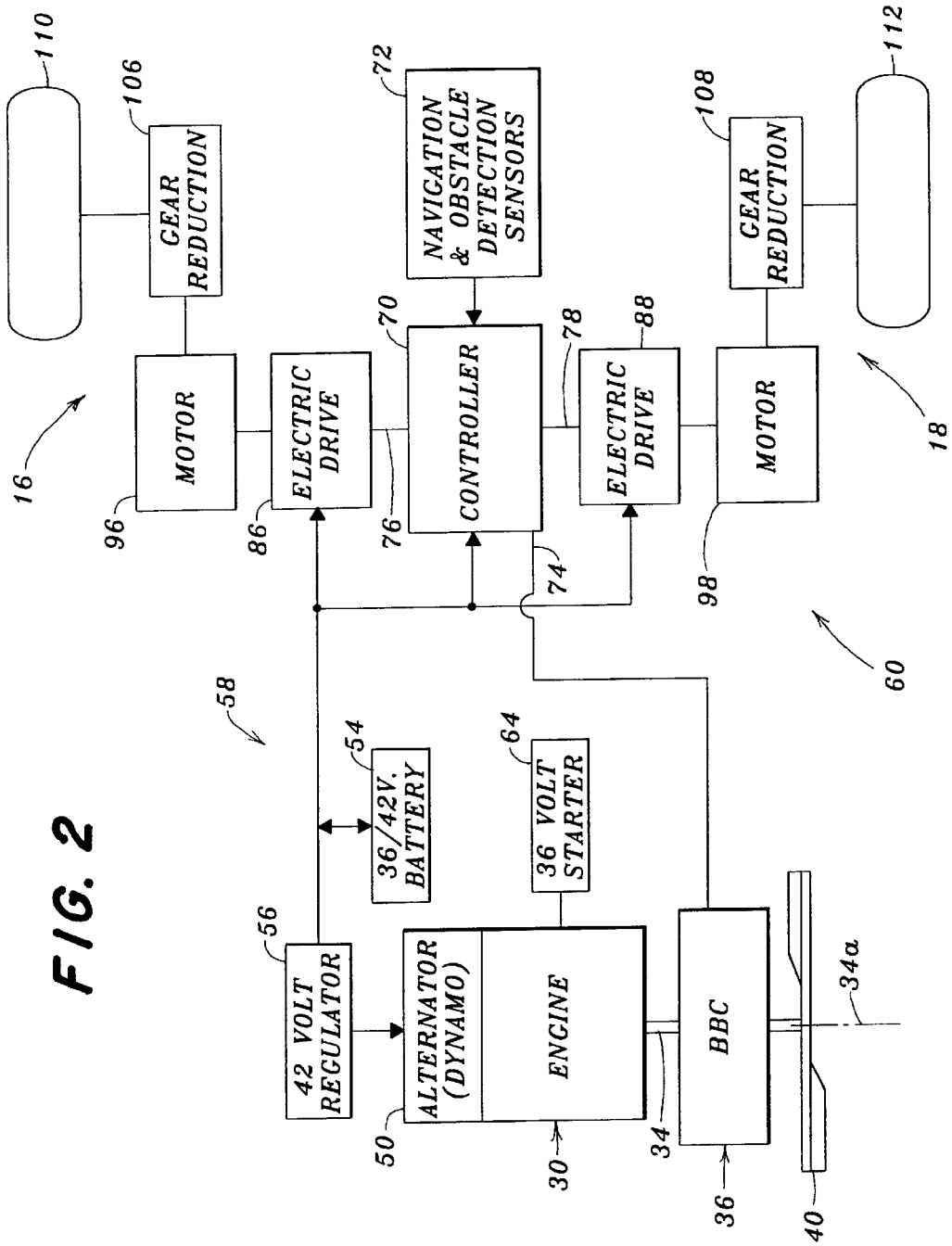
FIG. 2 is a schematic of the drive system for the mower of FIG. 1.

Supported within an upper engine housing is an electrical generator 252, preferably an alternator, driven by the engine 230 and connected to a battery pack 254 (FIG. 3) through a regulator (not shown) in the manner described above with respect to FIG. 2. An electrical propulsion and navigation system 260 is provided which is generally identical to the system 60 shown in FIG. 2 and described above for the mower 10, with the drive wheel assemblies 216 and 218 corresponding to the drive wheel assemblies 16 and 18 in FIG. 2. The blade brake clutch assembly 36 of FIG. 2 is replaced with the electric PTO clutch 236, which is connected to the output 74 of the controller 70. The system 260 will not be described in further detail here, and reference may be had to FIG. 2 and the discussion above for details of the electric propulsion and navigation. A tactile sensor or bumper indicated generally at 270 is also provided on the mower 210 shown in FIGS. 3 and 4. The sensor 270 provides an additional input to the navigation and obstacle detection circuit 72.

Engine drive is provided directly to the winged blades 246 and 247 via belt drive 238 and the synchronous or V-belt drive between the shafts 242 and 244, while mower propulsion is provided exclusively by the electrical power source 58. The electric motors 96 and 98 are controlled to provide mower speed, direction and steering control. Again, different types of electric drive and navigation systems as well as different direct engine drives to the cutting devices may be utilized with the system of the present invention.

Having described the preferred embodiment, it will become apparent that various modifications can be made without departing from the scope of the invention as defined in the accompanying claims.

What is claimed is:

1. A self-propelled mower having a frame supporting internal combustion engine structure, a source of electrical energy driven by the engine structure, and a driven cutting device for cutting vegetation, the mower including drive wheel structure having spaced wheels supporting the frame, a forward caster wheel centrally located relative to the cutting device and the spaced wheels, first and second electrically driven motors operably connected to the drive wheel structure and to the source of electrical energy for providing mower propulsion primarily from source of electrical energy to propel and steer the mower over the ground where the vegetation is present, and a cutter drive connected between the engine structure and the cuffing device and driving the cuffing device primarily from the engine structure, the cutter drive including a clutch connected to the engine and a cutter drive shaft connected to the cutting device, wherein the cutting device includes a clutch control, and further comprising obstacle detection structure operably connected to the clutch control and controlling drive from the engine to the cutting device.

2. The self-propelled mower set forth in claim 1 wherein the cutter drive shaft is generally centered relative to the caster wheel and the drive wheel structure.

3. The self-propelled mower set forth in claim 1 wherein the cutting device includes at least two mower blades supported from the frame and wherein the forward caster wheel is located between the mower blades.

4. The self-propelled mower set forth in claim 1 wherein the cutting device includes at least two mower blades supported from the frame for rotation about generally parallel axes, the parallel axes are upright and the drive shaft is generally parallel to the axes, and wherein the caster wheel is located between the axes.

5. The self-propelled mower set forth in claim 1 wherein the cutter drive comprises a hydraulic drive with a hydraulic pump powered by the engine.

6. The self-propelled mower set forth in claim 1 wherein the cutting device comprises a grass cutting reel.

7. The self-propelled mower set forth in claim 6 wherein the cutter drive comprises a hydraulic motor connected to the grass cutting reel and a hydraulic pump member connected to the engine and to the hydraulic motor.

8. A self-propelled mower having a frame supporting internal combustion engine structure, a source of electrical energy driven by the engine structure, and a driven cutting device for cutting vegetation, the mower including drive wheel structure having spaced wheels supporting the frame, a forward caster wheel centrally located relative to the cutting device and the spaced wheels, first and second electrically driven motors operably connected to the drive wheel structure and to the source of electrical energy for providing mower propulsion primarily from the source of electrical energy to propel and steer the mower over the ground where the vegetation is present, and a cutter drive connected between the engine structure and the cutting device and driving the cuffing device primarily from the engine structure, the cutter drive including a clutch connected to the engine and a cutter drive shaft connected to the cuffing device, wherein the cutter drive includes an engine drive shaft and wherein the cutter drive shaft is coupled directly to the engine drive shaft through the clutch, and wherein the source of electrical energy includes an engine-driven generating device and the clutch includes a control input connected to a clutch controller.

9. The self-propelled mower set forth in claim 8 wherein the clutch controller is part of a main controller connected to the wheel structure and to the source of electrical energy, and including a navigation system connected to the main controller and providing autonomous control of the mower.

10. A self-propelled mower having a frame supporting an engine, a source of electrical energy driven by the engine, and a driven cutting device for cutting vegetation, the mower including drive wheel structure supporting the frame, an electrical motor operably connected to the drive wheel structure and to the source of electrical energy for propelling the mower over the ground where the vegetation is present, a cutter drive connected between the engine and the cutting device and driving the cutting device directly from the engine, wherein the cutter drive includes a controllable clutch device, and a navigation and obstacle detection control operably connected to the clutch device.

11. The self-propelled mower set forth in claim 10 wherein the drive includes a shaft connected to the engine and wherein the navigation and obstacle detection control includes obstacle avoiding sensor structure, wherein the controllable clutch device is responsive to the sensing of an obstacle by the sensor structure.

12. The self-propelled mower set forth in claim 10 wherein the cutting device includes a mower blade, the navigation and obstacle detection control controlling the clutch device in response to detection of an obstacle.

13. The self-propelled mower set forth in claim 10 wherein the cutting device comprises a reel mower driven by the engine.

14. The self-propelled mower set forth in claim 10 wherein the navigation and obstacle detection control provides automatic engagement and disengagement of the cutting device.

15. The self-propelled mower set forth in claim 14 wherein the drive wheel structure includes first and second drive wheels connected to first and second electric motors, and wherein the first and second electric motors are connected to the navigation and obstacle detection control and are independently controllable to provide steering for the mower.

16. A self-propelled mower having a frame supporting an engine, a source of electrical energy driven by the engine, and a driven cutting device for cutting vegetation, the mower including drive wheel structure supporting the frame, an electrical motor operably connected to the drive wheel structure and to the source of electrical energy for propelling the mower over the ground where the vegetation is present, a cutter drive connected between the engine and the cutting device and driving the cutting device directly from the engine; a controller connected to the source of electrical energy and to the drive wheel structure and providing automatic control of the mower; and wherein the cutter drive includes a clutch device connected to the controller and selectively connecting the engine to the cutting device.

17. The self-propelled mower set forth in claim 16 further comprising a navigation system connected to the controller and providing autonomous control of the mower.

18. An autonomous mower comprising a fore-and-aft extending frame having forward and aft ends, drive wheel structure supporting the aft end of frame for movement over grass to be cut, the drive wheel structure including first and second transversely offset rear drive wheels, a forward caster wheel supporting the forward end of the frame, the rear drive wheels and forward caster wheel providing primary support of the frame, an internal combustion engine supported on the frame, a source of electrical power including a generating device driven by the engine, a drive shaft extending from the engine, a grass cutting device, a controllable drive coupler connecting the cutting device to the drive shaft for drive by the engine, electric motor structure connected to the drive wheel structure and to the source of electrical power for electrically propelling the frame over the grass using primarily the source of electrical power, and control structure including an obstacle detection device connected to the drive coupler for automatically controlling drive to the cutting device.

19. The autonomous mower set forth in claim 18 wherein the control structure includes an electrical controller connected between the source of electrical power and the electric motor structure to provide steer by driving function for the drive wheel structure, and a navigation system connected to the controller and steering the mower over a selected path.

20. An autonomous mower comprising a frame, drive wheel structure supporting the frame for movement over grass to be cut, an internal combustion engine supported on the frame, a source of electrical power including a generating device driven by the engine, a drive shaft extending from the engine, a grass cutting device operably connected to the drive shaft for drive primarily by the engine, electric motor structure connected to the drive wheel structure and to the source of electrical power for electrically propelling the frame over the grass using primarily the source of electrical power, an electrical controller connected between the source of electrical power and the electric motor structure to provide steer by driving function for the drive wheel structure, and a navigation system connected to the electrical controller and steering the mower over a selected path, and including an electrically activated clutch connecting the cutting device to the drive shaft, wherein the clutch is connected to the electrical controller.

21. The autonomous mower set forth in claim 20 wherein the clutch is connected to the drive shaft and the cutting device includes a blade, wherein the drive shaft and blade have a common axis of rotation.

22. The autonomous mower set forth in claim 20 wherein the grass cutting device comprises at least two blades having axes of rotation, and a single caster wheel located between the axes of rotation adjacent the blades, the single caster wheel and the drive wheel structure providing substantially all support of the frame over the grass.

23. The autonomous mower set forth in claim 22 wherein drive wheel structure includes two rear wheels located outwardly of and behind the axes of rotation of the blades and the single caster wheel is located forwardly of axes of rotation.

24. The autonomous mower set forth in claim 21 wherein an obstacle detection circuit is connected to the controller and the electrically activated clutch is responsive to the detection of an obstacle.

25. A self-propelled autonomous mower comprising a frame, drive structure supporting the frame for movement over grass to be cut, an internal combustion engine supported on the frame, a source of electrical power including an engine-driven generating device supported by the frame, a grass cutting device, means operably connecting the internal combustion engine to the grass cutting device for direct drive exclusively by the engine, electric motor structure connected to the drive structure, means connecting the electric motor to the source of electrical power for electrically propelling the frame over the grass, and wherein the means operably connecting the internal combustion engine to the grass cutting device comprises a clutch connected to the engine, a drive shaft connected to the grass cutting device and to the clutch, and control means for automatically engaging and disengaging drive between the engine and the cutting device.

26. The self-propelled autonomous mower set forth in claim 25 wherein the means connecting the electric motor to the source of electrical power includes an electric drive connected to the control means.

27. The self-propelled autonomous mower set forth in claim 25 wherein the engine includes a vertical drive shaft, the grass cutting device comprises a blade rotatable about a vertical axis, and the control means includes an obstacle detection structure.

* * * * *